United States Patent [19]

Stone et al.

[11] Patent Number: 5,058,107

[45] Date of Patent: Oct. 15, 1991

[54] EFFICIENT DIGITAL FREQUENCY DIVISION MULTIPLEXED SIGNAL RECEIVER

[75] Inventors: Wade J. Stone, Los Angeles; Kikuo Ichiroku, Santa Monica; Edwin A. Kelley; Don C. Devendorf, both of Los Angeles, all of Calif.

[73] Assignee: Hughes Aircraft Company, Los Angeles, Calif.

[21] Appl. No.: 293,894

[22] Filed: Jan. 5, 1989

[51] Int. Cl.[5] ................................................ H04J 1/00
[52] U.S. Cl. ................................... 370/69.1; 370/120; 370/123; 455/189; 455/324
[58] Field of Search .................. 370/50, 70, 69.1, 120, 370/123, 72, 62; 375/82; 333/166; 455/179, 180, 182, 188, 189, 190, 323, 324

[56] References Cited

U.S. PATENT DOCUMENTS

| | | | |
|---|---|---|---|
| 4,312,062 | 1/1982 | Bellanger et al. | 370/70 |
| 4,375,691 | 3/1983 | Hackett | 370/69.1 |
| 4,590,595 | 5/1986 | Morimura | 370/50 |
| 4,768,187 | 8/1988 | Marshall | 370/123 |
| 4,800,573 | 1/1989 | Cupo | 370/69.1 |
| 4,884,265 | 11/1989 | Schroeder et al. | 370/70 |
| 4,912,775 | 3/1990 | Matsuura | 455/189 |

OTHER PUBLICATIONS

*Multirate Digital Signal Processing*, Crochiere and Rabiner, Prentice-Hall, Inc., Englewood Cliffs, New Jersey 07632, 1983, pp. 42-47.

Primary Examiner—Douglas W. Olms
Assistant Examiner—Alpus H. Hsu
Attorney, Agent, or Firm—Terje Gudmestad; Leonard A. Alkov; Wanda K. Denson-Low

[57] ABSTRACT

A digital intermediate frequency (IF) receiver for frequency division multiplexed (FDM) signals including analog circuitry for receiving FDM signals and an analog-to-digital (A/D) converter for converting the received signals to a sampled digital received signal. A digital complex mixer responsive to the digital output of the A/D converter translates the spectrum of the sampled digital received signal to center the desired FDM channel at zero frequency (DC). Digital low pass filtering isolates the desired channel centered at DC, and a digital complex mixer can be used to translate the isolated selected channel to a predetermined IF frequency. The in-phase portion of the digital IF centered selected channel or the DC centered complex envelope selected channel can then be provided to appropriate demodulation or decoder networks.

16 Claims, 5 Drawing Sheets

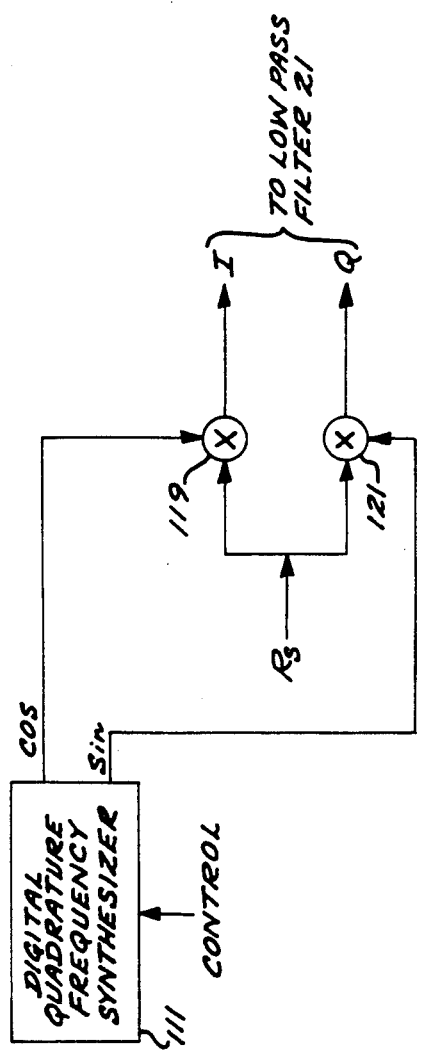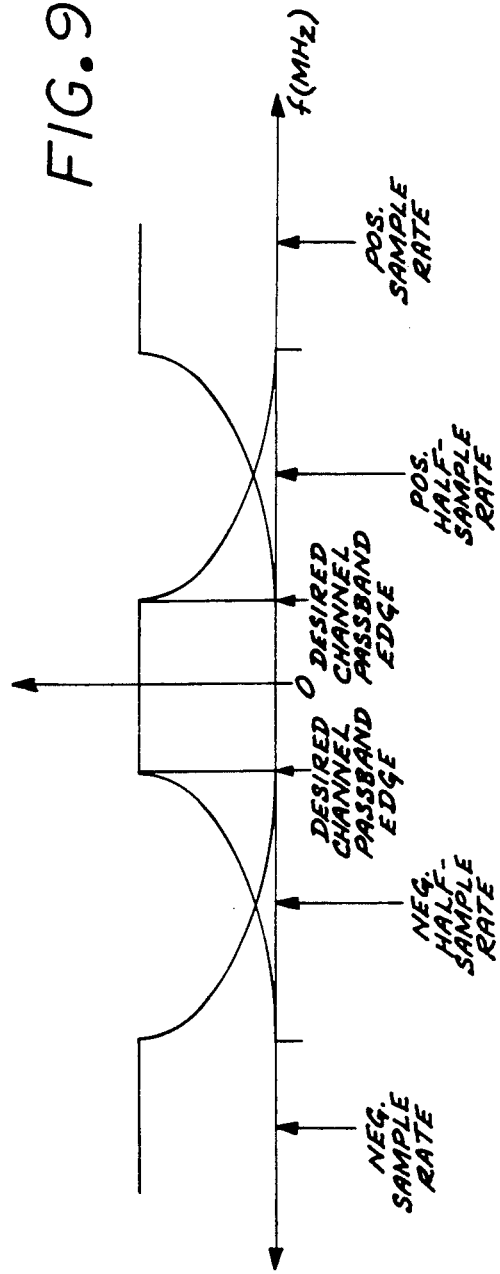

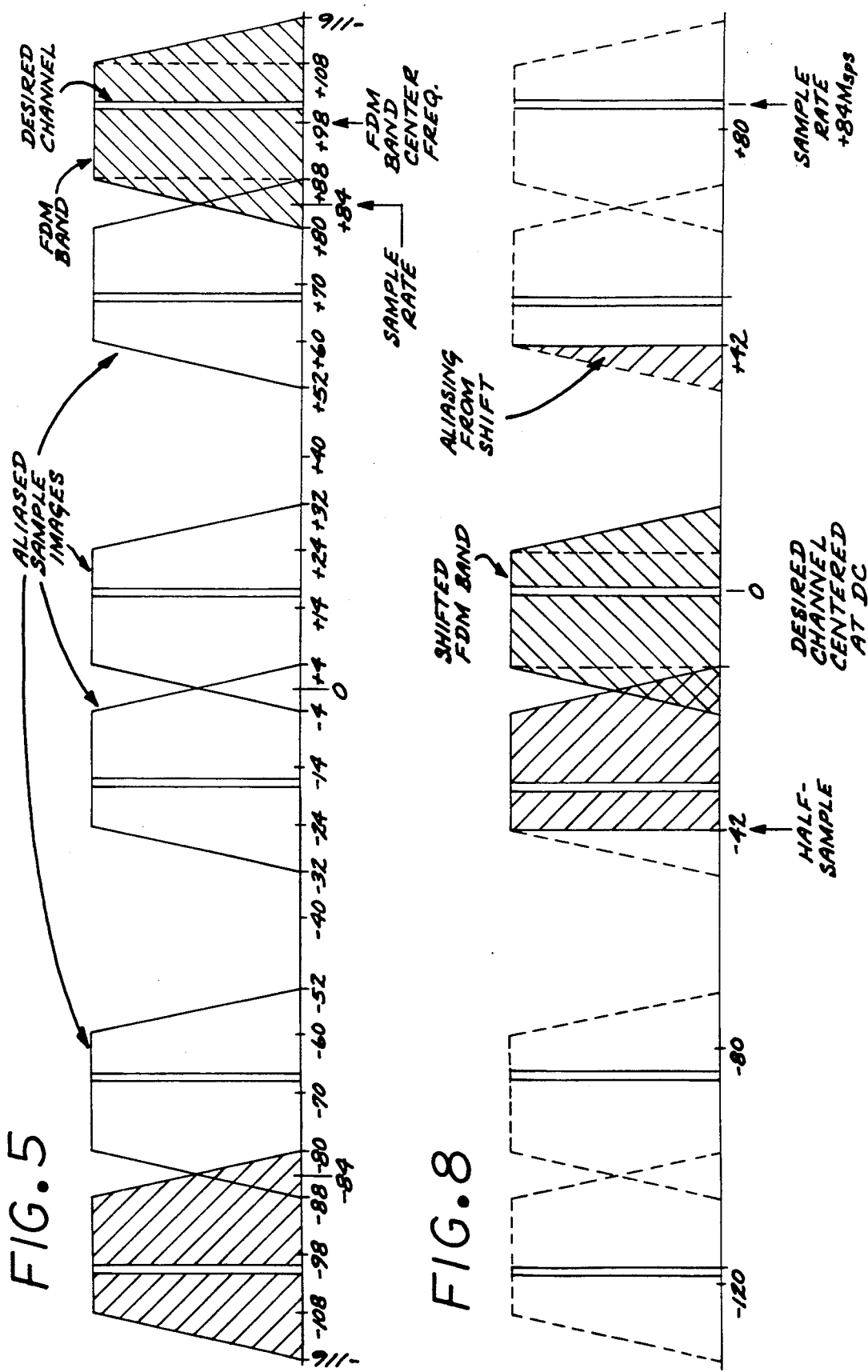

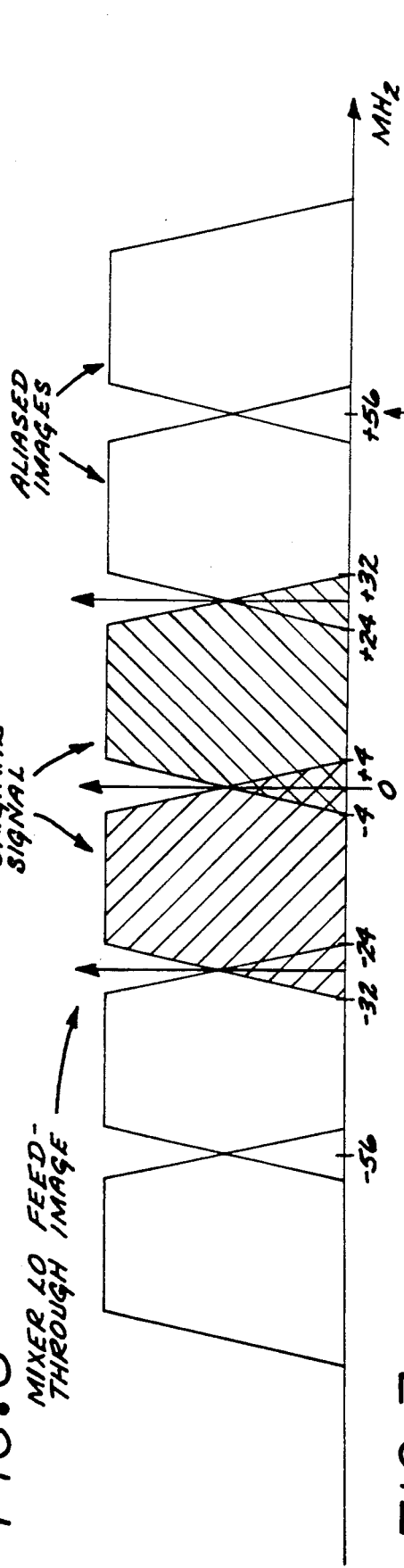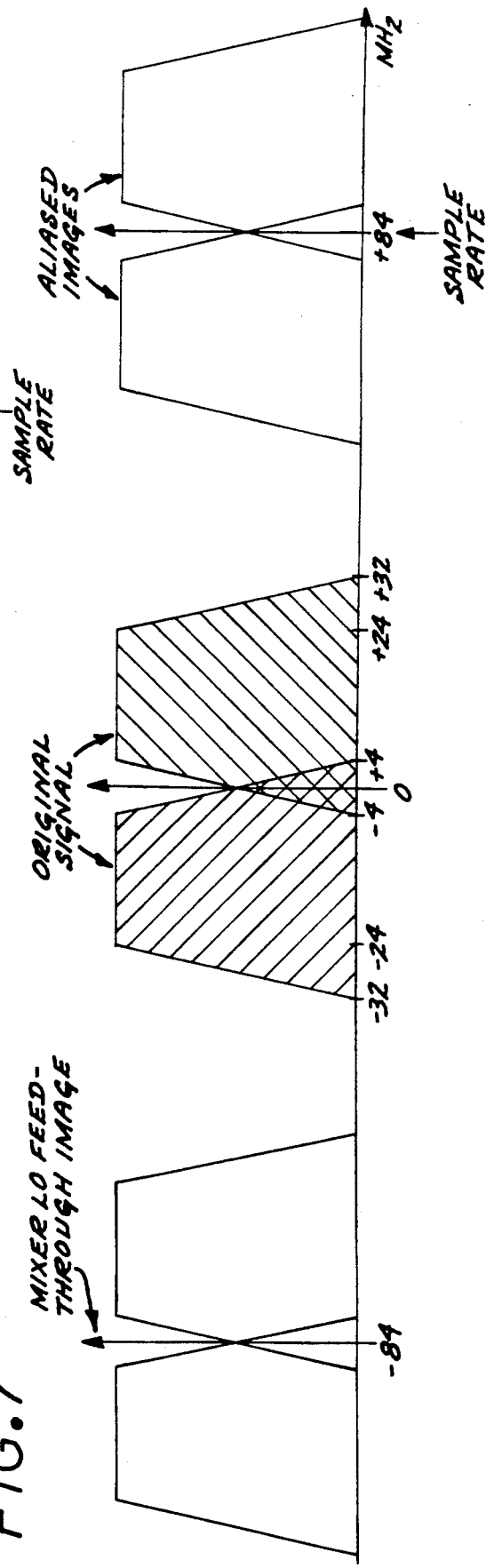

EFFICIENT DIGITAL FREQUENCY DIVISION MULTIPLEXED SIGNAL RECEIVER

BACKGROUND OF THE INVENTION

The disclosed invention relates generally to an intermediate frequency (IF) receiver for frequency division multiplexed signals, and more particularly is directed to a digital IF receiver for frequency division multiplexed (FDM) signals such as frequency modulation (FM) radio broadcast signals.

Frequency division multiplexed (FDM) communications utilizes adjacent frequency bands or channels commonly characterized by respective carrier frequencies, such frequency bands being in a specified bandwidth which is typically wideband. A commonly known example of wideband FDM communications is the amplitude modulation (AM) radio broadcast band, which in the U.S. is fixed at 550 KHz to 1600 KHz with the channels spaced 10 KHz apart. Another commonly known example of wideband FDM communications is the FM radio broadcast band, which in the U.S. utilizes a 20 MHz bandwidth, from 88 MHz to 108 MHz.

Typically, a receiver for FDM communications includes an IF receiver which converts a selected channel of the received modulated radio frequency (RF) signal to a modulated signal having a lower carrier frequency called the IF carrier. The converted signal is provided to detection and decoding circuitry which provides appropriate output signals, such as the left and right audio outputs of an FM stereo tuner.

Typically, IF receivers are mostly analog, sometimes with some digital processing after the actual tuner function (i.e., after the isolation of the selected channel).

Important considerations with analog IF receivers include the necessity of precision circuit manufacturing techniques and the attendant non-automated manual adjustments. Noise is a significant undesired component and must always be carefully considered, from design to assembly. Distortion must be considered throughout the entire IF receiver circuitry. Undesired mixer products are present and may distort the channel of interest, and mixer local oscillator feedthrough is a problem. Many of the analog components are bulky and not amenable to integration, and moreover are subject to drift over time and with temperature which must be considered and reasonably compensated. Analog filters inherently have non-linear phase characteristics.

SUMMARY OF THE INVENTION

It would therefore be an advantage to provide a digital IF receiver for frequency division multiplexed signals which does not have the distortion, drift, and signal-to-noise ratio limitations of analog IF receivers.

Another advantage would be to provide a digital IF receiver for frequency division multiplexed signals which is readily manufactured with high yield mass production techniques.

The foregoing and other advantages are provided in a digital IF receiver which includes circuitry for receiving frequency division multiplexed signals and an analog-to-digital converter for converting the received signals to a sampled digital received signal. A digital complex mixer responsive to the digital received signal frequency translates the digital received signal to provide a digital complex mixer output having the desired frequency multiplexed channel centered at zero frequency and represents the complex envelope of the signal. Digital low pass filter circuitry filters the digital mixer output to isolate the desired filtered digital frequency multiplexed channel centered at zero frequency. A digital complex mixer responsive to the filtered digital frequency multiplexed channel translates the selected channel to a predetermined IF frequency.

BRIEF DESCRIPTION OF THE DRAWING

The advantages and features of the disclosed invention will readily be appreciated by persons skilled in the art from the following detailed description when read in conjunction with the drawing wherein:

FIG. 4 is a block diagram of a digital quadrature frequency synthesized complex mixer which can be utilized as the complex digital mixer of the digital IF receiver of FIG. 1.

FIG. 5 is a schematic illustration of the spectral characteristics of an illustrative example of a sampled digital received FM broadcast signal provided by the analog-to-digital converter of the analog signal processor of FIG. 2.

FIG. 6 is a schematic illustration of the spectral characteristics of an illustrative example of a sampled digital received FM broadcast signal provided by the analog-to-digital converter of the analog signal processor of FIG. 3 for a first sample frequency.

FIG. 7 is a schematic illustration of the spectral characteristics of an illustrative example of a sampled digital received FM broadcast signal provided by the analog-to-digital converter of the analog signal processor of FIG. 3 for a second sample frequency.

FIG. 8 is a schematic illustrative example of the spectral characteristics of the frequency translated digital received. FM broadcast signal provided by the complex mixer of the IF receiver of FIG. 1.

FIG. 9 is a schematic illustration of the spectral characteristics of a digital filter/re-sampler pair of the IF receiver of FIG. 1.

DETAILED DESCRIPTION

Figure 1:
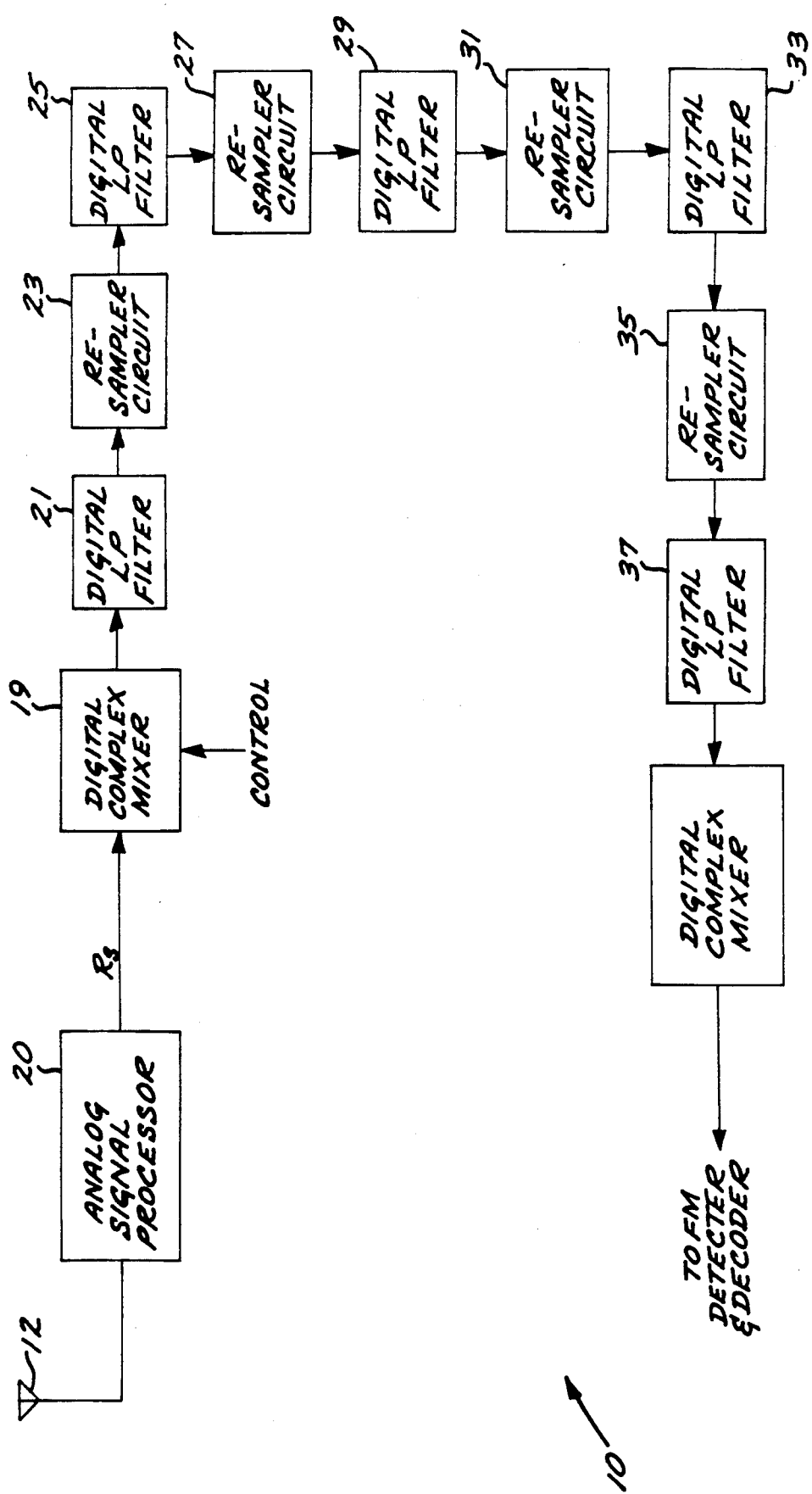
FIG. 1 is a schematic block diagram of a digital IF receiver in accordance with the invention for the particular example of an FM band receiver.

In the following detailed description and in the several figures of the drawing, like elements are identified with like reference numerals.

The invention relates to frequency division multiplexed (FDM) communication systems which typically include adjacent frequency bands or channels characterized by respective carrier frequencies. For ease of reference, a particular channel being selected or tuned for reception shall be referred to as the selected channel or frequency, the latter referring to the carrier frequency associated with the selected channel.

The FDM signals for a given communications system are typically constrained to be within a specified bandwidth, which for ease of reference is called herein the frequency division multiplexed signal band or the FDM signal band.

Referring now to FIG. 1, shown therein is a digital intermediate frequency (IF) receiver 10 which by way of illustrative example will be described as an IF receiver for receiving FDM signals within the frequency modulation (FM) radio broadcast band, which in the U.S. occupies a 20 MHz bandwidth between 88 MHz and 108 MHz.

The digital IF receiver 10 includes an analog signal processor (ASP) 20 for receiving FDM signals within a predetermined FDM band via an antenna 12, and provides a sampled digital received signal $R_S$ which includes the FDM band of interest translated to a lower frequency band. Example embodiments of the ASP 20 are set forth in FIGS. 2 and 3.

Figure 2:
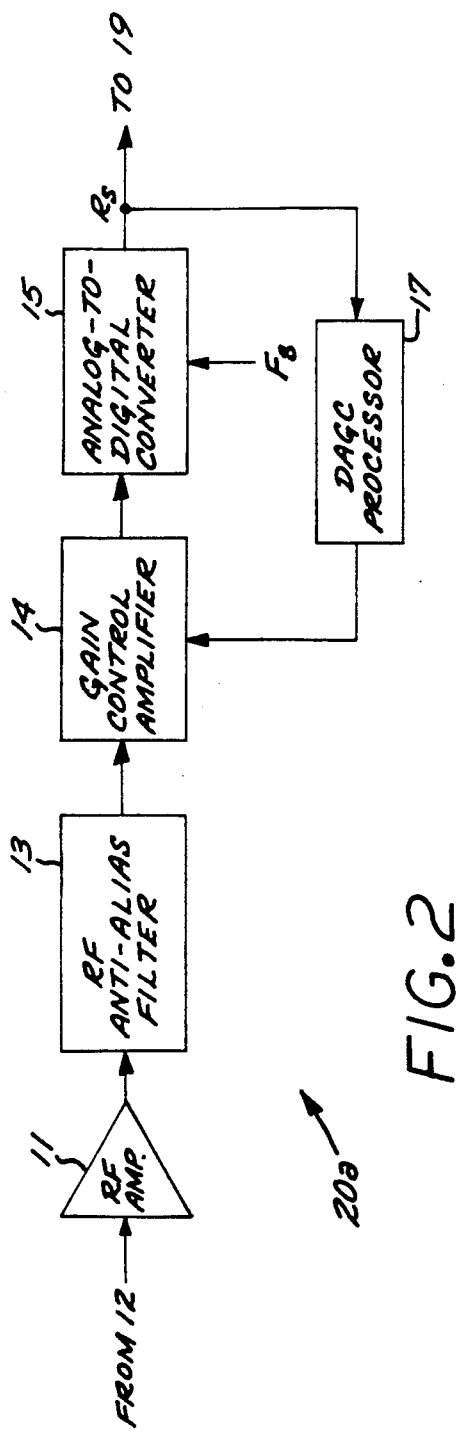
FIG. 2 is a block diagram of one embodiment of the analog signal processor of the digital IF receiver of FIG. 1.

Referring now to FIG. 2, the ASP 20A shown therein includes a radio frequency (RF) amplifier 11 for receiving FDM signals within a predetermined FDM signal band via the antenna 12. The output of the RF amplifier 11 is provided to an RF anti-alias filter 13 which provides its filtered RF output to a gain controlled amplifier (GCA) 14 which can be of known design. The output of the GCA 14 is provided to a high speed precision analog-to-digital (A/D) converter 15 which provides a sampled received signal $R_S$.

The GCA 14 is controlled by a periodically updated feedback digital control word provided by a digital automatic gain control (DAGC) processor 17 which is responsive to the output $R_S$ of the A/D converter 15. The DAGC processor 17 can also be of known design and includes peak detection circuitry and control word generating circuitry. The control word is converted to a stable analog current which is utilized to control the gain of the GCA 14.

The characteristics of the RF anti-alias filter 13 would depend on the specific application and requirements, and preferably should have very close to linear phase and should have minimum loss. Generally, the RF anti-alias filter 13 has an appropriate passband, defined at an appropriate attenuation level such as −3 dB, which extends from the lowest frequency to the highest frequency of the FDM band of interest. Outside of the passband, the location of the stopband edges, defined at an appropriate rejection level such as −100 dB, would depend on the A/D converter sampling rate to the degree that the filter skirts (i.e., the regions between a passband edge and the adjacent stopband edge) from aliased spectral images do not encroach upon the passband of the desired spectral image.

Pursuant to analyses known in the art, the sample rate of the A/D converter 15 would depend on (a) whether baseband or bandpass sampling is utilized, (b) the signal information bandwidth and/or maximum signal frequency, and (c) aliased image location. Baseband sampling requires a sample rate that is at least twice as high as the highest instantaneous frequency contained in the signal being sampled. Bandpass sampling allows for a sample rate that is less than the frequency of the lower band edge so long as the sample rate is at least twice the bandwidth of the signal provided by the RF anti-alias filter 13. However, in order to obtain a distortion free aliased image with bandpass sampling, the sample rate $F_s$ should be chosen to meet the following requirements:

$$F_s = 4nF_{BW} + F_L \quad \text{(Equation 1)}$$

$$\tfrac{1}{2}f_{trans} \leq F_L \leq \tfrac{1}{2}F_s - (F_{BW} + \tfrac{1}{2}f_{trans}) \quad \text{(Equation 2)}$$

where $F_{BW}$ is the bandwidth of the FDM band, n is an integer, $f_{trans}$ is the filter skirt width of the RF anti-alias filter (also known as the transition band), and $F_L$ is the location of the lower band edge of the desired aliased image.

For the FM broadcast implementation, the RF anti-alias filter 13 can have a −3 dB passband from 88 MHz to 108 MHz and stopband edges at 80 MHz and 116 MHz with −100 dB attenuation at the stopband edges. A bandpass sample rate of 84 MHz (i.e., for m equal to 1 in equation 1) is chosen to produce a desired sampled aliased image of the FDM band contained between 4 Mhz and 24 Mhz. FIG. 5 schematically depicts the spectral content of the sampled received signal output $R_S$ of the A/D converter 15 for the FM broadcast implementation. As is well known, the spectral content of a single channel analog filtered and sampled signal includes a negative image and aliased images due to sampling. In FIG. 5, the positive and negative mirror images which lie within the original FDM band are shaded.

Figure 3:
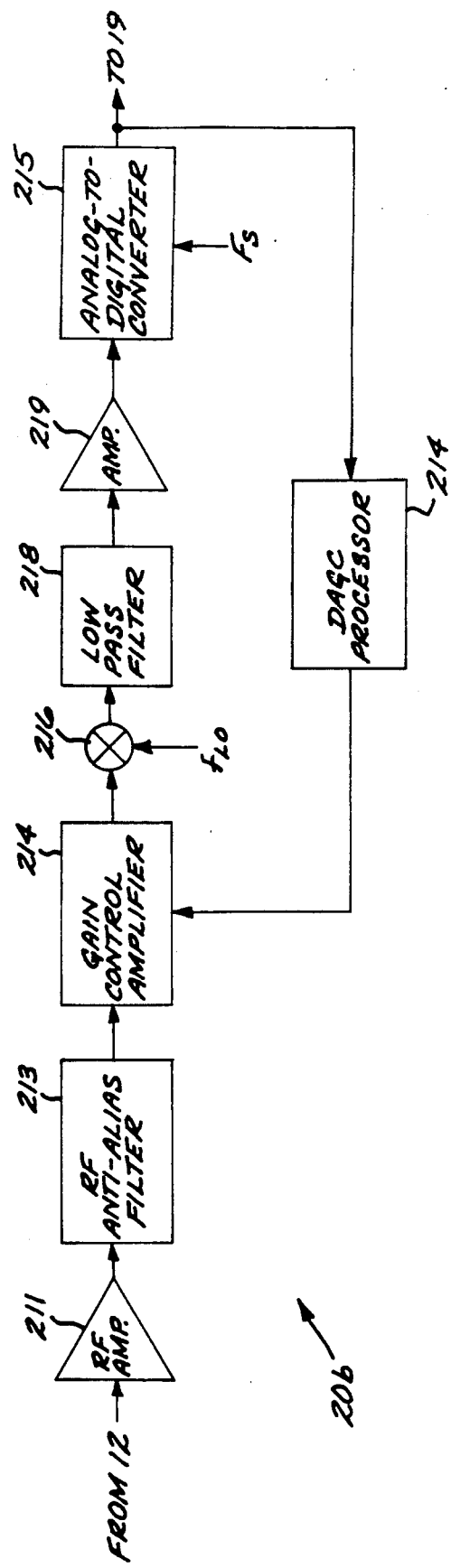
FIG. 3 is a block diagram of another embodiment of the analog signal processor of the digital IF receiver of FIG. 1.

Referring now to FIG. 3, shown therein is a block diagram of a further embodiment of an ASP 20B which includes an RF amplifier 211, an RF anti-alias filter 213, a GCA 214, and a DAGC processor 217, which are substantially the same as the corresponding elements in the ASP 20A of FIG. 2. The output of the GCA 214 is provided to an analog mixer 216 which is further responsive to a fixed local oscillator (LO) frequency $f_{LO}$ and provides a fixed frequency shift from the FDM band to baseband. The analog output of the mixer 216 is provided to a low pass filter 218 having its output coupled to an amplifier 219. The output of the amplifier 219 is provided to a high speed precision analog-to-digital (A/D) converter 215 which provides the sampled digital received signal $R_S$.

The analog mixer 216 can be of known design and must be linear to an appropriate specification within the overall system error budget. For the FM broadcast illustrative example, the LO frequency can be 84 MHz which translates the FDM band of interest to be contained between 4 Mhz and 24 MHz.

It should be appreciated by persons skilled in the art that the automatic gain control function provided at the output of the anti-alias filter 213 could could be provided at the output of the low pass filter 218.

The low pass filter 218 has a passband edge $f_{PLP}$ at the translated frequency that corresponds to the high passband edge of the FDM band of interest, and should have a stopband edge frequency $f_{SB}$ that generally is less than the lower passband edge frequency $f_{PFDM}$ of the original FDM band, so that frequencies in the original FDM band are rejected. Optimally, the stopband edge frequency $f_{SB}$ of the low pass filter 218 should be less than or equal to the difference between the sample rate $F_s$ of the A/D converter 215 and the low pass filter passband edge. Thus, the stopband edge frequency $f_{SB}$ of the low pass filter 218 can be characterized (a) generally by the following Equation 3, and (b) optimally by the following Equation 4:

$$f_{SB} \leq f_{PFDM} \quad \text{(Equation 3)}$$

$$f_{SB} \leq F_s - f_{PLP} \quad \text{(Equation 4)}$$

Conservatively, the transition region of the low pass filter 218 could be substantially similar to the high transition region of the RF anti-alias filter 213. Preferably, the low pass filter should have very close to linear phase and minimal loss.

It should be appreciated that utilizing a sample rate $F_s$ that is an integral multiple of the LO frequency eliminates feedthrough of the LO frequency into the sampled translated FDM bandwidth, and thus might make the low pass filter 218 unnecessary.

As discussed above relative to the ASP 20A of FIG. 2, baseband sampling requires a sample rate that is at least twice the highest frequency of interest, which in the FM broadcast example would be a sample rate of 48 MHz. However, a higher sample rate should be used to provide a margin of error for non-ideal filtering. Specifically, in order to obtain a distortion free sampled baseband output, the sample rate $F_s$ should be chosen to meet the following criteria:

$$F_s \geq F_{smin} \qquad \text{(Equation 5)}$$

$$F_{smin} = 2[f_{trans} + f_{BW}] \qquad \text{(Equation 6)}$$

where $F_{smin}$ is the minimum sample rate, $f_{trans}$ is the transition band or skirt width of the low pass filter 218 or the RF anti-alias filter 213 if the low pass filter 218 is not utilized, and $f_{BW}$ is the bandwidth of the FDM band of interest.

For the FM broadcast implementation, the RF anti-alias filter 213 has the same characteristics as the RF anti-alias filter 13 of the ASP 20A of FIG. 2. Based on the previously discussed criteria for the low pass filter 218, the low pass filter 218 would have a passband edge at 24 MHz and a stopband edge at 32 Mhz (i.e., a transition band of 8 MHz) for the FM broadcast implementation. The minimum sample rate based on Equation 6 would be 56 MHz, and FIG. 6 schematically depicts the spectral content of the sampled received signal output $R_s$ of the A/D converter 215 for that rate. As is well known, the spectral content of a single channel analog filtered and sampled signal includes a negative image and aliased images around integer multiples of the sample frequency. In FIG. 6, the positive and negative mirror images which lie within the baseband translation of the original FDM band are shaded.

Higher sample rates can be utilized with the ASP 20B of FIG. 3, which would place less stringent requirements on the low pass filter 218, or possibly eliminate the need for it, but would impose more stringent requirements on the A/D converter 215. For example, a sample rate of 84 MHz, the same as that illustrated for the ASP 20A of FIG. 2 for the FM broadcast example, could be utilized. FIG. 7 schematically depicts the spectral content of the sampled received signal for a sample rate of 84 MHz, which for the same sample rate is spectrally substantially similar to the spectral content of the output of the ASP 20A of FIG. 2 as depicted in FIG. 5. In FIG. 7 the positive and negative mirror images which lie within the baseband translation of the original FDM band are shaded.

For ease of understanding of the circuitry downstream of the analog signal processor 20, the FM broadcast illustrative example will be described relative to a sample rate of 84 MHz at the output of the ASP 20.

The sampled digital received signal $R_s$ of the ASP 20 is provided to a digital complex mixer 19 which by way of example is shown in FIG. 4 as a digital quadrature frequency synthesis mixer. It should be readily appreciated that the term "complex" refers to the output of the mixer 19 which includes in-phase and quadrature components (I and Q) that can be mathematically represented with "complex numbers," as is well known in the art. In complex number representations, the in-phase and quadrature components are commonly called "real" and "imaginary" components.

Complex mixing is utilized since this allows the entire spectrum to be shifted in one direction, as distinguished from "real" mixing (i.e., where only one multiplication is utilized) which can result in distortion producing overlapping images. As is well known, real mixing produces four images of the original positive and negative spectral images. As to each of the original images, the output of a "real" mixer includes two images displaced positively and negatively relative to the location of the original image, and inappropriate choice of the local oscillator frequency could result in distortion due to overlapping images.

The digital complex mixer of FIG. 4 includes a digital quadrature frequency synthesizer 111 which receives an input control signal indicative of the selected channel to be tuned. The digital frequency synthesizer 111 can be of known design and provides sampled digital sine and cosine outputs having the same frequency as the carrier frequency of the selected channel to be tuned. In traditional terminology, the outputs of the digital quadrature frequency synthesizer 111 can be considered the local oscillator (LO) quadrature outputs.

The cosine output of the digital quadrature frequency synthesizer 111 is provided as one input to a first multiplier 119, while the sine output of the digital quadrature frequency synthesizer 111 is provided as one input to a second multiplier 121. The sampled RF signal $R_s$ is coupled as further inputs to both the first multiplier 119 and the second multiplier 121.

The outputs of the multipliers 119, 121 are respectively the in-phase and quadrature components (I and Q) of a complex signal which includes the desired sampled aliased FDM band image (which was between 4 MHz and 24 MHz in the illustrative FM broadcast example) translated in frequency with the selected FDM channel centered at zero frequency (DC). This frequency translation is determined by the frequency of the output of the digital quadrature synthesizer 111 which in turn is controlled by its input control signal. The spectral characteristics of the complex output of the digital complex mixer 19 for the FM broadcast example is schematically shown in FIG. 8.

Since the output of the complex mixer 19 includes components in addition to the selected channel (e.g., shifted aliased images and unselected channels), low pass filtering is required to isolate the selected FDM channel that is centered at DC. Such filtering includes respective non-complex filtering for the in-phase and quadrature components, with the filter coefficients having only "real" components; i.e., each filter coefficient only has one component and does not have an "imaginary" component.

The low pass filtering of the output of the complex mixer 19 can be provided by a single digital filter having appropriately sharp cutoff and linear phase characteristics. Preferably, however, cascaded low pass filter and re-sampler pairs are utilized to provide for more efficient filter operation and less complicated filter structures. With cascaded filter/re-sampler pairs, the passband edge of each filter is the same as the passband edge of the desired channel that is centered at DC. The stopband edge of a given filter is determined by the re-sample rate to be applied to the filter output as well as the passband edge. The amount of stopband suppression for each filter is determined by the allowable alias criterion for the overall system. For background information on cascaded filter/re-sampler circuits, reference is made to Chapter 5 of *Multirate Digital Signal Processing*, Crochiere and Rabiner, Prentice-Hall, Inc., Englewood Cliffs, N.J. 07632, 1983, and particularly to pages 193-250.

For the FM broadcast example, appropriate composite low pass filtering provided by multi-stage filtering can include a passband from DC to 75 KHz and approximately 100 dB stopband suppression beginning at about 125 KHz.

Continuing with our illustrative FM broadcast example, the complex output of the digital complex mixer 19 is provided to a first digital low pass filter 21 which can comprise, for example, a finite impulse response (FIR) filter or an infinite impulse response (IIR) filter of known configuration. The output of the first digital low pass filter 21 is provided to a first re-sampler circuit 23 which reduces the sample rate. In the FM broadcast example, the illustrative sample rate of 84 MHz is reduced by a factor of ¼ to 21 MHz.

The output of the re-sampler 23 is provided to a second digital low pass filter 25 which provide further low pass filtering. The output of the digital filter 25 is provided to a second re-sampler 27 further reduces the sample rate. In the FM broadcast example, the sample rate of 21 MHz is reduced by a factor of ¼ to 5.25 MHz.

The output of the re-sampler 27 is provided to a third digital low pass filter 29 which provides further low pass filtering. The output of the filter 29 provided to a third re-sampler 31 to reduce the sampling rate. In the FM broadcast example, the sample rate of 5.25 MHz is reduced by a factor of ¼ to 1.3125 MHz.

The output of the re-sampler 31 is provided to a fourth digital low pass filter 33 which provides still further low pass filtering. The output of the filter 33 is coupled to a fourth re-sampler 35 which further reduces the sampling rate. For the FM broadcast example, the sample rate of 1.315 MHz is reduced by a factor of ½ to 0.65625 MHz or 656.25 KHz.

FIG. 9 schematically depicts the spectral characteristics of one of the above-described filter/re-sampler pairs, generally illustrating the foldback of filter skirts around the half sample frequency via aliasing as a result of re-sampling. Such foldback can be a source of distortion in the baseband passband region if the filter stopbands are not appropriately suppressed.

The output of the fourth re-sampler 35 is provided to a final digital low pass filter 37. The output of the digital low pass filter 37 includes the selected FDM channel isolated and centered at DC.

Depending on the chosen demodulator that processes the output of the digital IF receiver 10, the output of the digital low pass filter 37 may be provided to a digital complex mixer 39 which translates the selected FDM channel to be centered at a predetermined IF frequency. The digital complex mixer 39 can be similar to the digital complex mixer 19 discussed above, except that the complex mixer 39 utilizes a fixed LO frequency and has complex data inputs. Essentially, the complex mixer 19 multiplies the complex output of the low pass filter 37 by a complex local oscillator frequency. Each sample output of the low pass filter 37 can be represented by the complex number $(A+jB)$, and the local oscillator phase at a given sample time can be represented by the complex number $(\cos(z)+j\sin(z))$, where j represents the square root of $-1$. The complex multiplication achieved by the complex mixer is as follows:

$$Y = (A + jB)*(\cos(z) + j\sin(z)) \quad \text{(Equation 7)}$$
$$= (A\cos(z) - B\sin(z)) + j(B\cos(z) + A\sin(z)) \quad \text{(Equation 8)}$$

where $(A\cos(z)-B\sin(z))$ is the in-phase or real component and $(B\cos(z)+A\sin(z))$ is the quadrature or imaginary component at the sample time. Of course, the complex mixer 39 can be implemented with techniques known in the art that efficiently reduce or eliminate actual multiplications.

The in-phase component of the output of the digital complex mixer 39 represents a very low distortion version of the selected FDM channel centered at an IF frequency which is symmetrical about DC in the frequency domain. Specifically in the illustrative FM broadcast example, the in-phase component of the output of the complex mixer 39 represents the selected frequency division multiplexed channel which is ready to be digitally de-modulated, and decoded, for example for FM stereo.

Although the foregoing digital IF receiver has been discussed to some extent in the context of receiving FM broadcast signals, the invention contemplates frequency division multiplexed communications in general. For other applications, the sample rates, filter characteristics, and other parameters would obviously have to be determined. As appreciated by persons skilled in the art, such determinations would be based upon filtering parameters for known analog systems, desired optimization, signal-to-noise ratio requirements, and other factors individual to each application.

The disclosed digital IF receiver provides advantages including the virtual elimination of mixer local oscillator feedthrough, local oscillator print-through (alteration of the local oscillator frequency due to intermodulation distortion), filter phase non-linearity, and IF blanketing (IF difference mixing caused by mixer products which comprise two different FDM channels). The performance capability can be made arbitrarily high in quality depending upon the linearity and resolution of the RF amplifier and the analog-to-digital converter, the complexity of the digital filters, and upon the digital wordsize utilized in the receiver. The processing is independent of information content and modulation. Signal-to-noise ratio is better due to sharp linear-phase digital filtering and re-sampling. Spurs caused by IF intermodulation distortion and errant mixer products are virtually eliminated.

The digital IF receiver of the invention is readily amenable to integration and can be made on a few VLSI chips. Moreover, the digital receiver of the invention has excellent manufacturability. Precision circuit techniques are not required beyond the amplifiers, the analog filters, the analog mixer if utilized, and the analog-to-digital converter, which allows the balance of the digital IF receiver to be reliably and consistently produced. Digital filters can readily be made to have superior phase linearity in comparison to analog filters.

Although the foregoing has been a description and illustration of specific embodiments of the invention, various modifications and changes thereto can be made by persons skilled in the art without departing from the scope and spirit of the invention as defined by the following claims.

What is claimed is:

1. A frequency division multiplex receiver for isolating a frequency division multiplex channel contained within a predetermined frequency division multiplex (FDM) band, comprising:
   an RF amplifier;
   an RF bandpass anti-alias filter having a pass-band for passing substantially the entire predetermined FDM band and having a skirt width $F_{trans}$, said passband including frequencies above a sample frequency $F_s$ at which the output of the filter is sampled;
   analog-to-digital conversion means for sampling the analog output of said anti-alias filter to provide an aliased frequency down converted digital version of the received frequency division multiplexed electromagnetic signals within the predetermined frequency division multiplex band, said analog to digital conversion means having a sample rate $F_s$ that is less than the lowest frequency in the predetermined FDM band and is equal to $4NF_{BW}+F_L$, where $F_{BW}$ is the bandwidth of the predetermined FDM band, N is equal to 1, and $F_L$ is the lower band edge of the aliased image resulting from the digital conversion sampling process and is subject to the following limits relative to the skirt width $F_{trans}$ of the bandpass anti-alias filter:

$$\tfrac{1}{2}F_{trans} \leq F_L \leq \tfrac{1}{2}F_s - (F_{BW} + \tfrac{1}{2}F_{trans})$$

whereby the output of the analog to digital conversion means includes a non-distorted aliased image of the predetermined frequency division multiplex band;
   a gain controlled amplifier responsive to the output of said analog to digital conversion mean for controlling the gain of the analog received RF signal provided to said analog to digital conversion means;
   digital complex frequency translation means for frequency translating said aliased frequency down converted digital signal to provide a frequency translated digital signal having the center of the selected channel at zero frequency; and
   means for filtering said translated sampled digital received signal to isolate said selected channel.

2. The receiver of claim 1 wherein said filtering means comprises:
   a first digital low pass filter responsive to said aliased frequency down converted signal for providing a first filter output; and
   a first sample rate reducing circuit responsive to said first filter output.

3. The receiver of claim 2 wherein said filtering means further includes a second digital low pass filter responsive to said fist sample rate reducing circuit for providing a second filter output.

4. The receiver of claim 1 wherein said filtering means comprises:
   first digital low pass filtering means responsive to said aliased frequency down converted signal for providing a first filter output; and
   second digital low pass filtering means responsive to said first filter output for providing a second filter output.

5. The receiver of claim 1 including a second frequency translating means responsive to said filtering means for translating said isolated selected channel to a predetermined intermediate frequency.

6. The receiver of claim 5 wherein said second frequency translating means comprises a digital complex mixer.

7. A frequency division multiplex receiver for isolating a selected frequency division multiplex (FDM) channel in a predetermined FDM band, comprising:
   an RF amplifier;
   an RF bandpass anti-alias filter having a pass-band for passing substantially the entire predetermined frequency division multiplex band and having a skirt width $F_{trans}$, said passband including frequencies above a sample frequency $F_s$ at which the output of the filter is sampled;
   analog-to-digital conversion means for sampling the analog output of said anti-alias filter to provide an aliased frequency down converted digital version of the received frequency division multiplexed electromagnetic signals within the predetermined frequency division multiplex band, said analog to digital conversion means having a sample rate $F_s$ that is less than the lowest frequency in the predetermined FDM band and is equal to $4NF_{BW}+F_L$, where $F_{BW}$ is the bandwidth of the predetermined FDM band, N is equal to 1, and $F_L$ is the lower band edge of the aliased image resulting from the digital conversion sampling process and is subject to the following limits relative to the skirt width $F_{trans}$ of the bandpass anti-alias filter:

$$\tfrac{1}{2}F_{trans} \leq F_l \leq \tfrac{1}{2}F_s - (F_{BW} + \tfrac{1}{2}F_{trans})$$

whereby the output of the analog to digital conversion means includes a non-distorted aliased image of the predetermined frequency division multiplex band;
   a gain controlled amplifier responsive to the output of said analog to digital conversion means for controlling the gain of the analog received RF signal provided to said analog to digital conversion means;
   means responsive to said aliased frequency down converted signal for generating a complex digital signal having in-phase and quadrature components and having a spectral content that is frequency translated relative to the frequency down converted signal so that the center of the selected channel is at zero frequency; and
   means for filtering said complex digital signal to isolate said selected channel.

8. The receiver of claim 7 wherein said filtering means comprises:
   a first digital low pass filter responsive to said aliased frequency down converted signal for providing a first filter output; and
   a first sample rate reducing circuit responsive to said first filter output.

9. The receiver of claim 8 wherein said filtering means further includes a second digital low pass filter responsive to said first sample rate reducing circuit for providing a second filter output.

10. The receiver of claim 7 wherein said filtering means comprises:
    first digital low pass filtering means responsive to said aliased frequency down converted signal for providing a first filter output; and
    second digital low pass filtering means responsive to said first filter output for providing a second filter output.

11. The receiver of claim 7 including a second frequency translating means responsive to said filtering means for translating said isolated selected channel to a predetermined intermediate frequency.

12. The receiver of claim 11 wherein said second frequency translating means comprises a digital complex mixer.

13. A frequency division multiplex receiver for isolating a selected frequency division multiplex (FDM) channel in a predetermined FDM band, comprising:

an RF amplifier;

an RF bandpass anti-alias filter having a pass-band for passing substantially the entire predetermined frequency division multiplex band and having a skirt width $F_{trans}$, said passband including frequencies above a sample frequency $F_s$ at which the output of the filter is sampled;

analog-to-digital conversion means for sampling the analog output of said anti-alias filter to provide an aliased frequency down converted digital version of the received frequency division multiplexed electromagnetic signals within the predetermined frequency division multiplex band, said analog to digital conversion means having a sample rate $F_s$ that is less than the lowest frequency in the predetermined FDM band and is equal to $4NF_{BS}+F_L$, where $F_{BW}$ is the bandwidth of the predetermined FDM band, N is equal to 1, and $F_L$ is the lower band edge of the aliased image resulting from the digital conversion sampling process and is subject to the following limits relative to the skirt width $F_{trans}$ of the bandpass anti-alias filter:

$$\tfrac{1}{2}F_{trans} \leq F_L \leq \tfrac{1}{2}F_s - (F_{BW} + \tfrac{1}{2}F_{trans})$$

whereby the output of the analog to digital conversion means includes a non-distorted aliased image of the predetermined frequency division multiplex band;

a gain controlled amplifier responsive to the output of said analog to digital conversion means for controlling the gain of the analog received RF signal provided to said analog to digital conversion means;

a first digital complex mixer for frequency translating said aliased frequency down converted signal pursuant to a selectable local oscillator frequency to provide a frequency translated sampled digital received signal having the center of the channel represented by said local oscillator frequency located at zero frequency;

digital low pass filtering means responsive to said frequency translated sample digital received signal for isolating said selected channel; and a second digital complex mixer for frequency translating said isolated selected channel to a predetermined intermediate frequency.

14. The receiver of claim 13 wherein said digital low pass filtering means comprises:

a first digital low pass filter responsive to said aliased frequency down converted signal for providing a first filter output; and a first sample rate reducing circuit responsive to said first filter output.

15. The receiver of claim 14 wherein said digital low pass filtering means further includes a second digital low pass filter responsive to said first sample rate reducing circuit for providing a second filter output.

16. The receiver of claim 13 wherein said filtering means comprises:

first digital low pass filtering means responsive to said aliased frequency down converted signal for providing a first filter output; and second digital low pass filtering means responsive to said first filter output for providing a second filter output.

* * * * *